(No Model.) 3 Sheets—Sheet 2.

G. R. STETSON & F. BUCHTER.
MACHINE FOR CLEARING TWIST DRILLS.

No. 309,259. Patented Dec. 16, 1884.

WITNESSES
J. Henry Taylor.
M. Lowe.

INVENTOR
George R. Stetson
Frank Buchter
by Alex. P. Browne
their attorney (No Model.) 3 Sheets—Sheet 3.

G. R. STETSON & F. BUCHTER.
MACHINE FOR CLEARING TWIST DRILLS.

No. 309,259. Patented Dec. 16, 1884.

WITNESSES
J. Henry Taylor.
M. Lowe.

INVENTOR
George R. Stetson
Frank Buchter
by Alex P Browne
their attorney

UNITED STATES PATENT OFFICE.

GEORGE RIPLEY STETSON AND FRANK BUCHTER, OF NEW BEDFORD, MASSACHUSETTS, ASSIGNORS TO SAID STETSON AND THE MORSE TWIST DRILL AND MACHINE COMPANY, OF SAME PLACE.

MACHINE FOR CLEARING TWIST-DRILLS.

SPECIFICATION forming part of Letters Patent No. 309,259, dated December 16, 1884.

Application filed January 17, 1884. (No model.)

*To all whom it may concern:*

Be it known that we, GEORGE R. STETSON and FRANK BUCHTER, both of New Bedford, in the county of Bristol and State of Massachusetts, citizens of the United States, have invented certain Improvements in Machinery for Clearing Twist-Drills, of which the following is a specification.

Our present invention relates to and is an improvement upon the general subject of Letters Patent No. 195,963, granted to George R. Stetson, dated October 9, 1877.

The operation called "clearing a twist-drill" consists in reducing the diameter of the drill gradually upon those portions of its cylindrical face which lie between the grooves. These portions are technically termed the "lands," and the clearing or gradually reducing the thickness of the lands of the drill is done in order to prevent the drill from dragging or binding when in use. For this purpose the gradual reduction or diminution of the land begins next that side which is the cutting-edge, and increases in amount gradually as it progresses back toward the other or opposite edge of the land. This is illustrated by the enlarged transverse section of a cleared drill shown at Figure 5.

In Stetson's patent above referred to a machine for clearing twist-drills is shown which operates by causing the drill and its lands to pass with a spiral motion along a fixed revolving cutter. Our present improvement embodies a revolving cutter traveling in a straight path over the surface of the curved or spiral land of a fixed revolving drill, this method of performing the operation being found to have several practical advantages over that described in the patent referred to.

Figure 1:
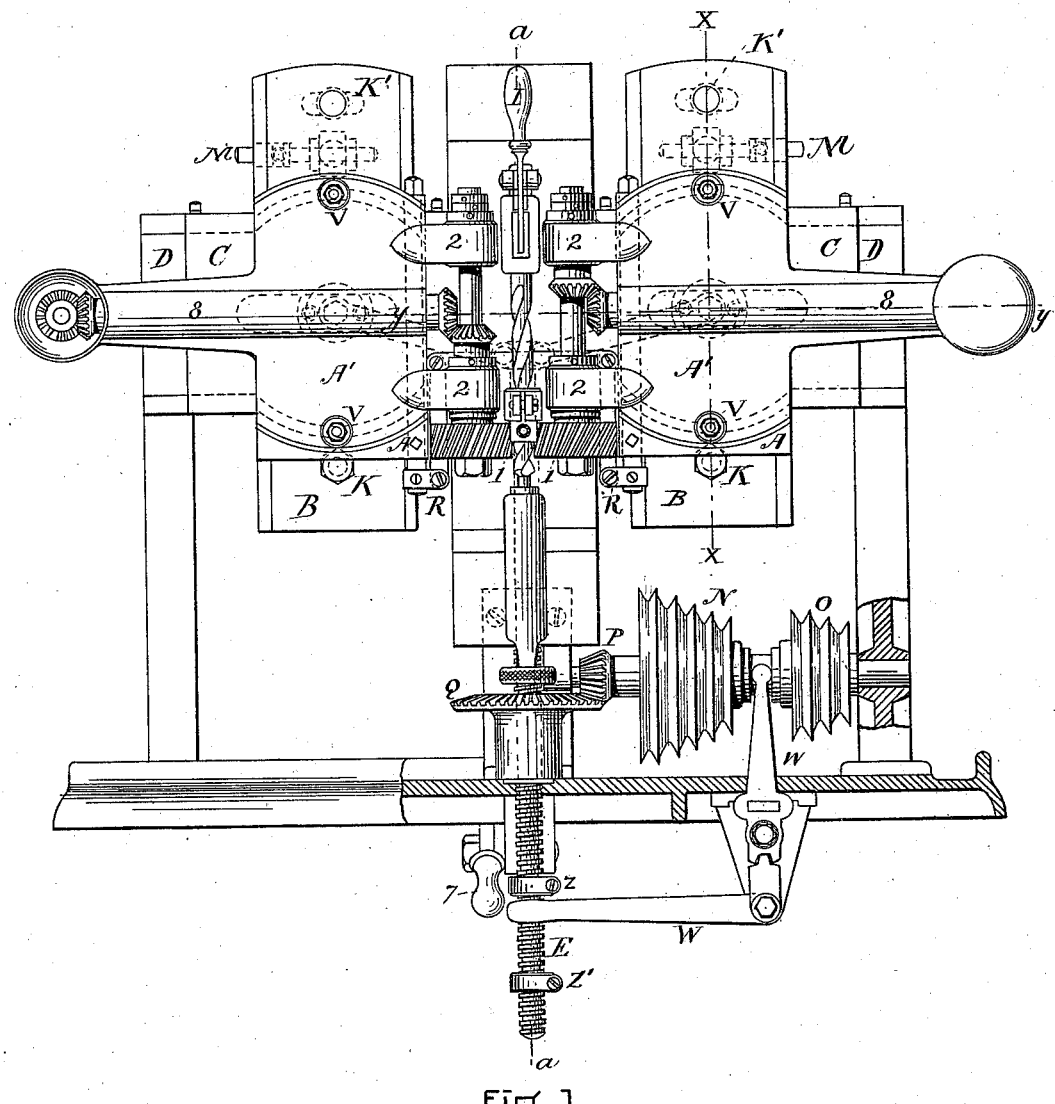
Figure 2:
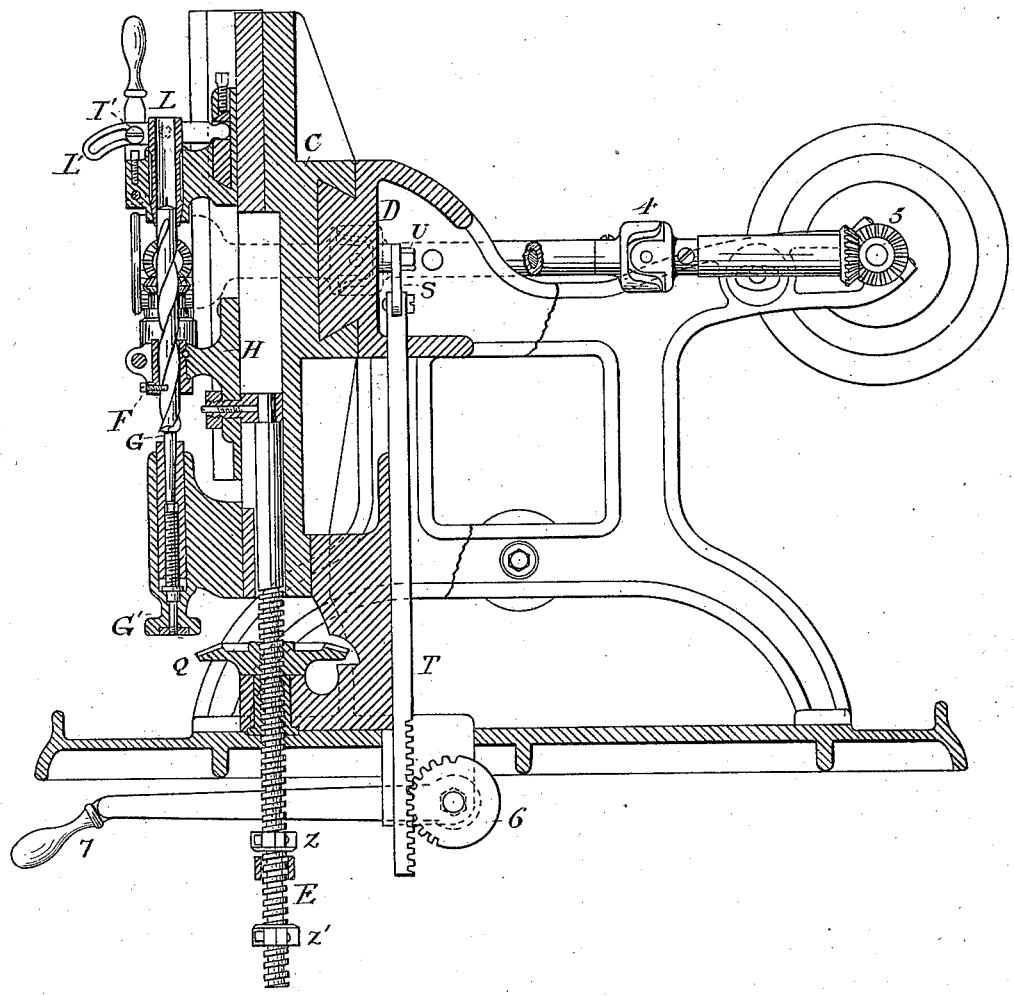
Figure 3:
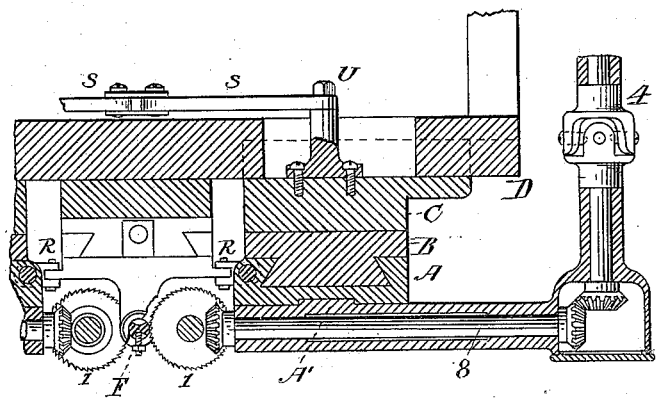
Figures 4, 5:
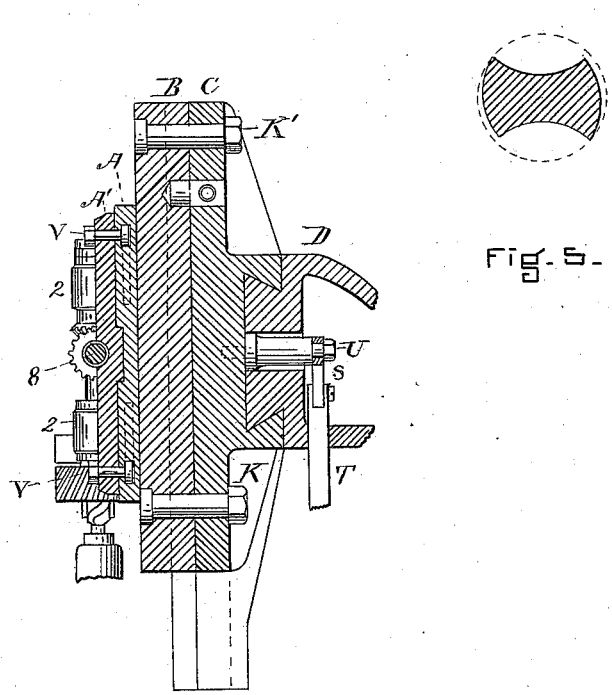

In the drawings we have shown at Fig, 1 a front elevation of a machine illustrating our present invention; at Fig. 2, a section of the same upon the line *a a* of Fig. 1; at Fig. 3, a horizontal section on the line *y y* of Fig. 1, and at Fig. 4 a vertical section upon the line *x x* of Fig. 1. Fig. 5 shows an enlarged transverse section of a cleared drill.

For the purpose of more rapid performance of the work of clearing, we employ a pair of revolving cutters, instead of the single cutter shown in Stetson's patent, and we provide mechanism for causing the revolving cutter to travel over and clear the lands of the drill, also mechanism for causing the cutter as it travels to follow the taper of the drill as it increases from the butt or stock to the point, and mechanism for moving the cutter up and away from its work, and for regulating the incline of the cutter to suit the various sizes of drill and the various degrees of clearance desired. We also provide mechanism for the rotation of the drill to be cleared while the cutter is passing over and clearing its lands.

The various motions of the cutters 1 1 are obtained as follows: The boxes or bearings 2 2 of the shafts of these cutters are attached to the double head-plates A A', Figs. 1 and 4. Each of these double head-plates consists of an outer plate, A', mounted upon an inner plate, A, which is in turn mounted upon a back plate, B, with which it engages by a dovetail, as shown in section at Fig. 3. The plate A' is connected to the plate A by means of bolts V V, working in concentric circular slots upon the inner plate, A. This construction enables the outer head-plate, A', with which the cutter 1 is connected, to be rotated upon its center, and thereby to vary the relative inclination of the cutter to the drill, as will be clear from inspection of Fig. 1. The dovetailed joint between the inner head-plate, A, and the back plate B enables the plate A and its attached plate A' to slide over the surface of the plate B. The back plate B, upon which the plate A slides, is itself attached to a second back plate, C. This attachment is by means of the bolts K K', the lower bolt, K, forming a pivot around which B may be moved upon C, which is slotted where the upper bolt, K', passes through it. By this means the direction of the line of travel of the plates A A', and consequently of the cutters, may be varied so as to conform with the taper of the drill previously referred to. The back plate C is itself attached to the cross-piece D (which is fixed and forms a part of the frame of the machine) by means of a dovetail, as shown in section at Fig. 4. This dovetail connection permits the plate C, with all its attached parts, to be moved sidewise while still supported upon the main frame of the machine. Such a motion of the plate C causes the cutters to move toward or away from their place of working. The drill itself is mounted at one end upon a center, G, on which it rotates, and at the other end is inclosed by a collet or chuck, L, within which it is also free to rotate. When so mounted, as will be seen, the drill is capable of rotation, but not of other motion, the parts which support the center G and the chuck or collet L being rigidly attached to fixed portions of the machine. This center G is adjustably extensible by means of the thumb-nut G', Fig. 2, and the chuck or collet L, which is split at its lower end in the common form to engage with the upper end of the drill, is caused to surround the upper or shank end of the drill by means of the slotted arm L', pivoted to the collet, and the radially-moving handle I, with its clamping-pin I', working in the slot of the arm L'.

The heads A A', to which the cutters are attached, as above explained, are themselves connected, by means of links R R, with a central slide, H, Figs. 2 and 3. This central slide is perforated, and the drill to be cleared passes through the perforation, through the wall of which is inserted a pin, F, which enters one of the grooves of the drill. The rotary motion of the cutters is obtained by means of transverse shafts 4, connected by beveled gears with the main shaft 5 of the machine, Fig. 2. Each of these transverse shafts is in turn connected by a beveled gear with another shaft, 8, Figs. 1, 3, and 4, which, by means of a beveled gear on the shaft of the cutter 1, imparts the rotary motion to the cutter. The central slide, H, is mounted upon a screw, E, carrying a beveled gear, Q, Figs. 1 and 2, which engages with a similar gear upon a transverse shaft, P, carrying a pair of fast and loose cone-pulleys, N O, Fig. 1. By means of these cone-pulleys the shaft is driven in opposite directions, and thus the screw E is similarly driven in one direction or the other, and the central slide, H, moved correspondingly. The engagement of one or the other of the pulleys with the shaft carrying it is regulated by the rock-shaft W, one arm of which is slotted, as shown. Through this slot the tail of the screw E passes, and a pair of adjustable stops, Z Z', operate the rock-shaft, and hence the fast and loose pulleys N O, automatically, in accordance with the extent of the travel of the screw E. These stops Z Z' are set upon the screw E at the proper distances to cause the clutch of either pulley N O to take place when the screw E and the slide H have moved through the desired interval. The forward motion of the screw E and the slide H causes the head-plates A A' to move in the same direction over their supporting-plates B, and thereby carries the revolving cutters 1 1 over the lands of the drill, which is itself revolved by means of the pin F, carried forward by the central slide, H, and entering the groove in the drill.

The moving of the cutters 1 1 apart or together is accomplished as follows: The plates C, which, by means of the intermediate connecting parts, carry these cutters, are connected by means of links S S, attached at one end to pins U U, secured to the plates C, Figs. 3 and 4. The other ends of these links S S are attached to a rod or bar, T, formed at its lower end as a rack, with which a segmental gear, 6, engages. Motion is given to this segmental gear by means of the handle 7, which, when moved in one direction, raises the rod or bar T, thrusts out the links S, and separates the plates C, and consequently the cutters 1 1. Motion of the handle 7 in the other direction draws down the rod T, draws in the links S, and brings together the plates C C, and consequently the cutters 1 1.

The operation of the machine is as follows: To insert the drill to be cleared, the cutters 1 1 are separated by means of the handle 7, rod T, and links S, as just described. The drill is then set in place upon the adjustable center G at one end, and within the chuck or collet L at the other end, which is then brought into place by means of the slotted arm L' and the handle I. The path of travel of the cutters 1 1 is next regulated to correspond with the taper of the drill. This adjustment is obtained by moving the plate B upon its supporting-plate C around the lower pivot, K, and securing it in the desired position by means of the nuts shown upon the bolts K K', Fig. 4. The next adjustment is that of the inclination of the cutters 1 1 to the face of the drill to produce the desired amount of clearance upon the land. This is done by moving the plate A' upon its supporting-plate A and securing it in the desired position by means of the nuts upon the bolts V V, as shown, Fig. 1. The cutters 1 1 being now brought up to engage with the lands of the drill, preferably at their upper point, or next the shank of the drill, the main shaft 5 of the machine, being started, transmits through the cross-shafts 4 8 rotary motion to the cutters 1 1. At the same time the pulley N, being made to clutch the shaft P, causes the screw E to move downward, and this imparts a like motion to the slide H. This slide in turn, by means of the links R R, imparts a similar motion to the sliding heads A A', and consequently to the revolving cutters 1 1. It also, as it moves, rotates the drill in its supports by reason of the pin F moving with the slide H and traveling in the groove of the drill. The cutters 1 1, as they pass over the lands of the drill, reduce or clear them in the manner described. When they have traversed the whole of the lands, the upper stop, Z, striking the rock-shaft W, releases the pulley N and makes fast the reverse pulley O, and this causes the shaft P, and consequently the screw E, to travel in the reverse direction and to bring back the slide H and the cutters 1 1 to their first or highest position. At the same time the cutters may be thrown away from the face of the lands of the drill by means of the handle 7, segmental gear 6, rod T, links S S, and connected parts, as before explained.

We claim—

1. In a machine for clearing twist-drills, the combination of a revolving cutter traveling substantially in the line of the taper of the drill, with a finger or pin, F, adapted to enter and pass along the groove of the drill, the cutter and finger being attached to and carried by a common moving part, H, all as herein specified.

2. In a machine for clearing twist-drills, the combination, with a revolving cutter of the character described, of mechanism, substantially as specified, for regulating the direction of travel of the cutter in accordance with the taper of the drill, and also with mechanism for regulating the angle or incline of the cutter in accordance with the amount of clearance desired, all substantially as herein set forth.

3. In a machine for clearing twist-drills, the combination of the cutters 2 2, mounted upon sliding bearings, as described, with the links R R and slide H, carrying the pin F, all substantially as and for the purposes herein set forth.

4. In a machine for clearing twist-drills, the combination of the cutters 2 2, mounted upon sliding bearings, as described, with the links R R, slide H, pin F, screw E, provided with stops Z Z', and rock-shaft W, arranged to operate a double clutch-pulley, N O, all substantially as herein described and set forth.

5. In a machine for clearing twist-drills, the combination, with the rotating cutter 2, mounted on a sliding bearing, as described, of the back plate B, upon which the said bearing slides, said plate having a fixed clamping-pivot, K, and a movable clamping-pivot, K', whereby the plate B may be set and held at the desired angle to the central line of the drill, substantially as herein set forth.

6. In a machine for clearing twist-drills, the combination, with the rotating cutters 2, attached to the double sliding plates A A', sliding upon the swinging back plate B, of the laterally or inwardly and outwardly movable or sliding plate C and the mechanism for moving or sliding the plate toward or away from the drill to be cleared, all substantially as herein described, and for the purposes set forth.

7. In a machine for clearing twist-drills, the combination of the chuck or collet L, attached to the slotted lever-arm L', and the hinged locking-lever I, provided with the clamping-pin I', all substantially as herein described, and for the purposes set forth.

8. In a machine for clearing twist-drills, the combination, with the sliding plates C C, of the links S S, rod T, having a rack-formed extension, segmental gear 6, and handle 7.

In testimony whereof we have hereunto subscribed our names this 4th day of January, A. D. 1884.

GEORGE RIPLEY STETSON.
FRANK BUCHTER.

Witnesses:
HENRY BARNARD WORTH,
ALBERT BROWNELL COLLINS.